United States Patent Office 3,649,669
Patented Mar. 14, 1972

3,649,669
BENZOXYALKYL SUBSTITUTED THIOPSEUDOUREAS
Bernard M. Regan, Chicago, Ill., assignor to Baxter Laboratories, Inc., Morton Grove, Ill.
No Drawing. Continuation-in-part of application Ser. No. 741,235, June 28, 1968. This application June 29, 1970, Ser. No. 50,930
Int. Cl. C07c 69/78
U.S. Cl. 260—477 6 Claims

ABSTRACT OF THE DISCLOSURE

New benzoxyalkyl substituted thiopseudoureas having local anesthetic properties, for example, 2-(2-benzoxyethyl)-2-thiopseudouronium chloride.

CROSS-REFERENCE TO RELATED APPLICATION

This is a continuation-in-part of co-pending application Ser. No. 741,235, filed June 28, 1968, now abandoned.

This invention relates to local anesthetics and, more particularly, to a method of inducing local anesthesia with certain substituted thiopseudoureas and their pharmaceutically acceptable acid salts.

Local anesthetics are employed for diminishing the pain in restricted areas as distinguished from general anesthetics used for eliminating the perception of all stimuli. Many of the known local anesthetics are derivatives of p-aminobenzoic acid, for example, procaine, tetracaine and butacaine. Lidocaine is another type of local anesthetic in wide use. Recently, in U.S. Pat. 3,124,595, an indolyl substituted thiopseudourea was disclosed as having local anesthetic activity among its various pharmacological properties. Most of these known anesthetic compounds are employed in the form of their pharmaceutically acceptable acid salts.

It is an object of this invention to provide a new and improved method of inducing local anesthesia.

It is another object of this invention to provide a method of inducing local anesthesia with certain substituted thiopseudoureas and their pharmaceutically acceptable acid salts.

In accordance with the present invention, a new and improved method of inducing local anesthesia in animals is provided which comprises applying to the tissues of an animal an effective amount of a substituted thiospseudourea having the formula:

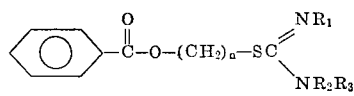

wherein $R_1$, $R_2$ and $R_3$ are each selected from the group consisting of hydrogen, lower alkyl having from 1 to about 3 carbon atoms and cyclohexyl; $n$ is an integer of from about 2 to 3; and the pharmaceutically acceptable acid salts thereof.

The substituted thiopseudoureas of the present invention can be conveniently prepared in the form of their halide salts, for example, by reaction of an appropriate alkyl halide and 2-thiourea. The free base form of the substituted thiourea can then be prepared by reacting the salt with an alkaline reagent, for example, sodium carbonate, sodium hydroxide, aqueous ammonia and other such alkaline reagents commonly employed for converting salts to free bases. The free base can be converted, in turn, to the salt form of the compound by reaction with a pharmaceutically acceptable acid, for example, sulfuric, phosphoric, nitric, hydrochloric, hydriodic, hydrobromic, acetic, tartaric, lactic, malic, fumaric, succinic, ascorbic, pyruvic and the like inorganic and organic acids known to be pharmaceutically acceptable.

The substituted thiopseudoureas of the present invention can be used as local anesthetic agents in the free base form or in the form of pharmaceutically acceptable acid salts of the free bases. For convenience in administration in aqueous solution, it is preferable to use the salt form of the compounds. The free base form is preferable when it is desired to use the compounds in oleaginous pharmaceutical diluents. The thiopseudoureas of the present invention can be conveniently administered topically or subcutaneously in the form of ointments, salves, aerosol sprays, solutions and the like. The effective amount of anesthetic agent to be administered will, of course, depend upon many factors such as, for example, the size of the local area to be anesthetized, the length of time anesthesia is desired, the nature of the treatment requiring local anesthesia, the physical condition of the subject undergoing treatment and other such factors. It will be understood that the method of the present invention includes any and all such variations in administering effective amounts of the local anesthetic agents of the present invention as would be apparent to those skilled in the art after reading this specification and is not limited to the illustrative embodiments of the invention specifically described herein.

The practice of the present invention is further illustrated by reference to the following examples in which all "parts" and "percentages" are "parts" and "percentages" by weight unless otherwise indicated.

EXAMPLE 1

The preparation of the local anesthetics of the present invention is illustrated by the following reaction:

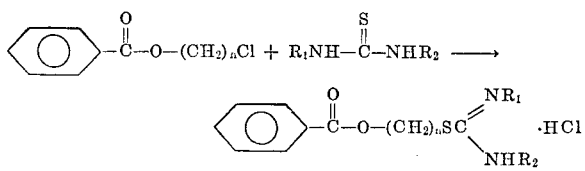

The chloroethyl or chloropropyl benzoate (0.1 mole) and an appropriate 2-thiourea (0.1 mole) are refluxed in 50 to 100 ml. of a mutual solvent for 16 to 20 hours. Preferred solvents are n-pentanone, methyl ethyl ketone and n-nitropropanone. The thioureas employed in this example preferably are 2-thiourea; 1-methyl-2-thiourea; 1,3-dimethyl-2-thiourea; 1,1-diethyl-2-thiourea; and 1-cyclohexyl-2-thiourea. The reaction products are concentrated in vacuo to dryness and then recrystallized from methanol, acetone or methanol-ethyl acetate solvents to yield white crystalline compounds.

Employing the above procedures, the following five compounds were prepared. Table I, below, sets forth the melting points and elemental analysis of these five compounds.

TABLE I

| Compound name and melting point | Analysis (percent) | | | | | | | |
|---|---|---|---|---|---|---|---|---|
| | Calculated | | | | Found | | | |
| | C | H | N | S | C | H | N | S |
| (a) 2-(2-benzoxyethyl)-1,3-dimethyl-2-thiopseudouronium chloride, M.P. 131–2° C | 49.91 | 5.93 | 9.70 | 11.10 | 49.81 | 6.13 | 9.51 | 11.33 |
| (b) 2-(2-benzoxyethyl)-2-thiopseudouronium chloride, M.P. 180.4° C | 46.06 | 5.02 | 10.74 | 12.30 | 46.21 | 5.12 | 10.93 | 12.50 |
| (c) 2-(3-benzoxypropyl)-1,3-dimethyl-2-thiopseudouronium chloride, M.P. 146–7° C | 51.56 | 6.32 | 9.25 | 10.59 | 51.66 | 6.28 | 9.18 | 10.43 |
| (d) 2-(2-benzoxyethyl)-1(3)-cyclohexyl-2-thiopseudouronium chloride, M.P. 158–9° C | 56.04 | 6.76 | 8.17 | 9.35 | 56.08 | 6.81 | 8.20 | 9.35 |
| (e) 2-(3-benzoxypropyl)-1(3)-cyclohexyl-2-thiopseudouronium chloride, M.P. 121–2° C | 57.21 | 7.06 | 7.85 | 8.98 | 57.42 | 7.22 | 8.10 | 8.92 |

NOTE.—C=Carbon; H=Hydrogen; N=Nitrogen; S=Sulfur.

EXAMPLE II

The compounds prepared in Example I were tested for local anesthetic activity in guinea pig cornea using a modified Chance and Lobstein[1] method and intradermally in guinea pig wheals using a modified Bulbring and Wajda[2] method. The lethal dose of these compounds were measured by intravenous injection in white mice. The anesthetic activity and toxicity values of these compounds were compared to those of lidocaine hydrochloride as the standard. Table II, below, sets forth the surface and infiltration anesthetic activity, toxicity, relative activity, relative toxicity and the ratio of relative activity to relative toxicity of these compounds. In these tables, the surface $EC_{50}$ is the concentration (mg./ml.) of anesthetic agent in normal saline which abolishes the corneal reflex in 50% of the corneas tested 5 minutes after installation of two or three drops. The infiltration $EC_{50}$ is the concentration (mg./ml.) of 0.25 ml. of anesthetic solution which causes a loss of response to painful stimuli in 50% of the wheals tested at the time of peak action, i.e., 5 minutes following intradermal injection. The $EC_{50}$ was estimated by the least-squares method from a three- to five-point plot of response vs concentration. Ten sites per concentration were each tested three times, and the responses were pooled. Two or more such $EC_{50}$ determinations were made and averaged to obtain the values given in the table. Standard errors were generally about 10% of the estimated $EC_{50}$.

Acute toxicity was estimated in male CF–1 mice. Five 0.15 log graded doses were injected intravenously into ten mice per dose, and the median lethal dose, $LD_{50}$, was determined 7 days later. Standard errors were generally about 10% of the estimated $LD_{50}$.

Relative activity, RA, is the ratio of the infiltration $EC_{50}$'s of the standard, lidocaine hydrochloride, to the test anesthetic. Similarly, relative toxicity, RT, is the ratio of the intravenous $LD_{50}$'s of standard to test anesthetic. The ratio, RA/RT, gives the safety margin of the test anesthetic relative to lidocaine hydrochloride, whose RA, RT and RA/RT are, by definition, unity.

All of the test compounds, Nos. (a) to (e), inclusive, were found to have safety margins better than the standard, lidocaine hydrochloride.

[1] Chance and Lobstein, J. Pharmacol. and Exper. Therap., vol. 82, page 203 et seq. (1944).
[2] Bulbring and Wajda, ibid., vol. 85, page 73 et seq. (1945).

Various minor additives can be employed in combination with the substituted thiopseudoureas of the present invention such as, for example, stabilizers, preservatives and the like substances for their desired effects. Thus preservative agents such as benzyl alcohol and the parabens, for example, methyl p-hydroxybenzoate, which are useful for their preservative effects in prolonging the shelf life of the local anesthetics of this invention can be employed with said anesthetics during their administration.

Numerous adaptations and modifications of the foregoing examples and various other examples will be apparent to the person skilled in the art after reading the foregoing specification and the appended claims without departing from the spirit and scope of the invention. All such further examples, adaptations and modifications are included within the scope of this invention.

What is claimed is:

1. A compound selected from the group consisting of (A) substituted thiopseudoureas having the formula

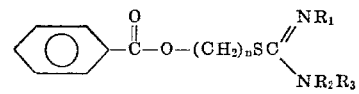

wherein $R_1$, $R_2$, and $R_3$ are each selected from the group consisting of hydrogen, lower alkyl having from 1 to about 3 carbon atoms and cyclohexyl; $n$ is an integer of from about 2 to about 3; and (B) the pharmaceutically acceptable acid salts thereof.

2. The compound of claim 1 in which the substituted thiopseudourea is 2-(2-benzoxyethyl)-1,3-dimethyl-2-thiopseudouronium chloride.

3. The compound of claim 1 in which the substituted thiopseudourea is 2-(2-benzoxyethyl)-2-thiopseudoronium chloride.

4. The compound of claim 1 in which the substituted thiopseudourea is 2-(3-benzoxypropyl)-1,3-dimethyl-2-thiopseudouronium chloride.

5. The compound of claim 1 in which the substituted thiopseudourea is 2-(2-benzoxyethyl)-1(3)-cyclohexyl-2-thiopseudouronium chloride.

TABLE II

| Compound: | Surf. $EC_{50}$. mg./ml. | Infil. $EC_{50}$. mg./ml. | Toxicity $LD_{50}$. mg./kg. iv. | RA. infil. | RT. i.v. | RA/RT |
|---|---|---|---|---|---|---|
| (a) | 0.36 | 0.48 | 39 | 1.6 | 0.8 | 2.0 |
| (b) | 1.45 | 1.0 | 62.5 | 0.7 | 0.5 | 1.4 |
| (c) | 0.9 | 0.19 | 29.5 | 3.9 | 1.1 | 3.5 |
| (d) | 0.4 | 0.19 | 18 | 3.9 | 1.8 | 2.2 |
| (e) | 0.32 | 0.20 | 11.1 | 3.7 | 2.9 | 1.3 |
| Lidocaine hydrochloride | 9.2 | 0.74 | 32 | 1.0 | 1.0 | 1.0 |

6. The compound of claim 1 in which the substituted thiopseudourea is 2-(3-benzoxypropyl)-1(3)-cyclohexyl-2-thiopseudouronium chloride.

References Cited

UNITED STATES PATENTS 3,124,595  7/1962  Bolger ------------ 260—326.1
3,577,552  5/1971  Regan ------------ 424—326

OTHER REFERENCES

Journal of Medicinal Chemistry, vol. 10, July 1967; Regan et al., pp. 649–52.

LORRAINE A. WEINBERGER, Primary Examiner
J. L. DAVISON, Assistant Examiner

U.S. Cl. X.R.

424—308